United States Patent
Hsieh

(10) Patent No.: US 7,484,701 B2
(45) Date of Patent: Feb. 3, 2009

(54) SUSPENSION DEVICE

(75) Inventor: Wu-Hong Hsieh, Lu Chou (TW)

(73) Assignee: K.H.S. Musical Instrument Co., Ltd. (TW)

( * ) Notice: Subject to any disclaimer, the term of this patent is extended or adjusted under 35 U.S.C. 154(b) by 179 days.

(21) Appl. No.: 11/492,094

(22) Filed: Jul. 25, 2006

(65) Prior Publication Data

US 2008/0023608 A1    Jan. 31, 2008

(51) Int. Cl.
*B42F 13/00* (2006.01)
(52) U.S. Cl. .................. 248/339; 248/307; 211/59.1; 211/106.01; 211/85.6
(58) Field of Classification Search ............... 248/304, 248/305, 306, 307, 339, 227.1, 231.41, 225.21, 248/224.7, 316.4, 229.12, 229.22; 84/327, 84/329, 421; 24/3.11, 300; 211/54.1, 57.1, 211/59.1, 7, 106.01, 87.01, 85.6
See application file for complete search history.

(56) References Cited

U.S. PATENT DOCUMENTS

| | | | | | |
|---|---|---|---|---|---|
| 2,193,699 | A | * | 3/1940 | Sadler | ..................... 248/307 |
| 4,126,290 | A | * | 11/1978 | Drouillard | ............ 248/231.41 |
| 5,265,929 | A | * | 11/1993 | Pelham | ..................... 296/97.6 |
| 5,582,377 | A | * | 12/1996 | Quesada | ............... 248/229.12 |
| 5,884,890 | A | * | 3/1999 | Fraley, Jr. | ................... 248/539 |

* cited by examiner

*Primary Examiner*—A. Joseph Wujciak, III
(74) *Attorney, Agent, or Firm*—Hershkovitz & Associates, LLC; Abe Hershkovitz

(57) ABSTRACT

A suspension device can be used to support a musical instrument for display. The suspension device has a holder and a mounting portion. The holder may be a clamp, is able to clamp and hold a musical instrument in position. The mounting portion has a stationary hook and a movable hook. The movable hook is connected with a resilient element that provides a force to pull the movable hook to move toward the stationary hook and therefor engages stably two support bars or support members at any intervals.

5 Claims, 8 Drawing Sheets

SUSPENSION DEVICE

BACKGROUND OF THE INVENTION

1. Field of the Invention

The present invention relates to a suspension device, and more particularly to a suspension device for banging at least one musical instrument to support members or strips of the musical instrument at any intervals.

2. Description of Related Art

Musical instruments are usually hung on a net support or a wall with at least one support member for display and sale. The net support normally has multiple support bars arranged in parallel on the net support. Each support member is elongated and has a slot with an inner surface formed longitudinally therein.

A musical instrument such as a guitar is hung on the net support or the wall with at least one support member via a suspension device. With reference to FIGS. 6, 7 and 8, a conventional suspension device (50) comprises a rod with a holder to fasten a musical instrument, and has a mounting surface and a support element. The mounting surface has an upper end and a lower end. The support element is formed on the mounting surface and may be implemented with a pair of hooks (51) as shown in FIG. 6, a mounting portion (52) as shown in FIG. 7 or a mounting portion (52) with a fastener (53) as shown in FIG. 8.

The hooks (51) protrude out from the mounting surface separately, each hook (51) has a free end facing to the free end of the other hook (51). The hooks (51) are hooked respectively onto two support bars (60) arranged at an interval and slightly compressed by the hooks (51) to securely hold the suspension device (50) on the bars (60).

The mounting portion (52) protrudes perpendicularly from the upper end of the mounting surface and has a retaining plate (520) extend perpendicularly from the mounting portion (52), received in a support member (61) having a channel (610) and abutting against the inner surface of the channel (610) to securely hold the suspension device (50) on the support member (61).

With reference to FIG. 8, the fastener (53) mounted through the suspension device (50) and has an end secured with a bracket (54) received in a channel (610) in a support member (61). The fastener (53) can be rotated to make the bracket (54) abut against the inner surface of the channel (610) of the support member (61) to generate an additional friction for supporting the suspension device (50).

As described, conventional suspension devices with different support element are capable of holding a musical instrument, however, they have disadvantages respectively. The support element with hooks (51) is only applied with net supports having support bars (60) at a specific interval and is not versatile in use. The mounting portion (52) of the conventional support element cannot provide a strong supporting effect to hold a musical instrument. Even though the mounting portion (52) with a fastener (53) can provide a stable supporting effect, but to adjust the two support members (61) to a desired interval is time-consuming and inconvenient.

To overcome the shortcomings, the present invention provides a suspension device to obviate or mitigate the aforementioned problems.

SUMMARY OF THE INVENTION

The main objective of the present invention is to provide a suspension device that is capable of supporting a musical instrument stably.

Another objective of the present invention is to provide a suspension device that is convenient in use and is adjustable for fitting with two support bars or two support members at any intervals.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
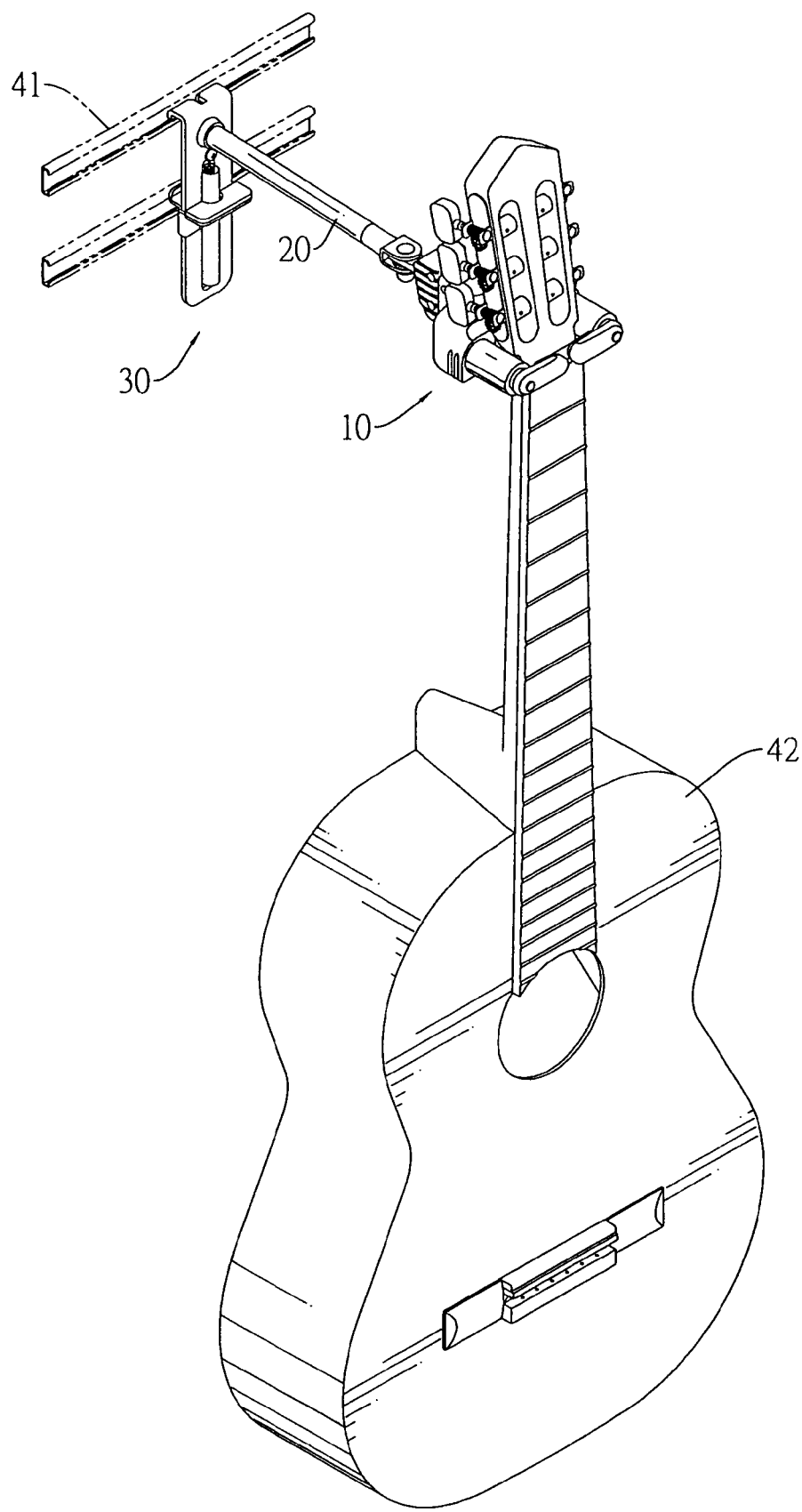
FIG. 1 is a perspective view of a suspension device in accordance with the present invention holding a musical instrument.
Figure 2:
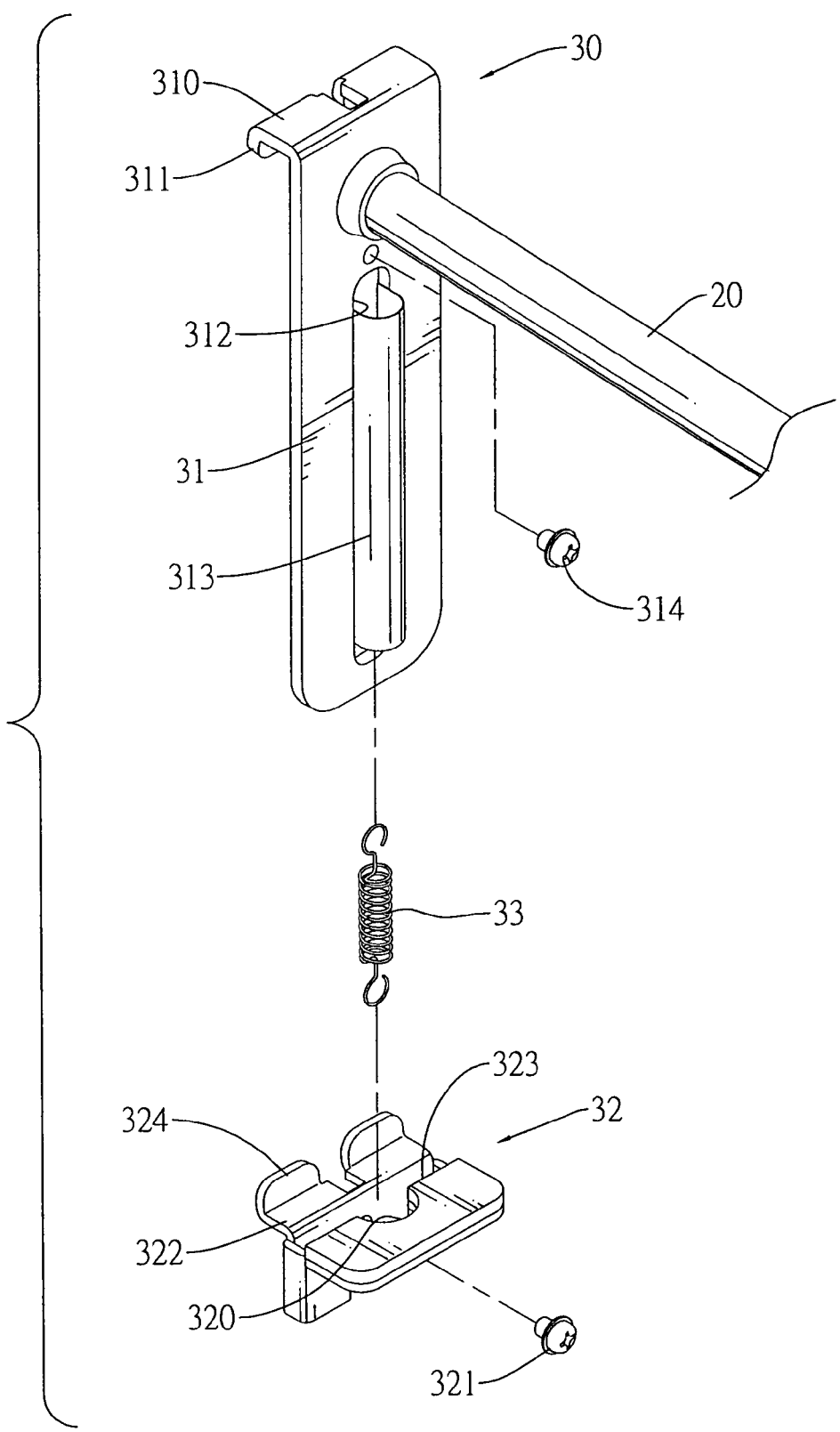
FIG. 2 is an exploded perspective view of the suspension device in FIG. 1.
Figure 3:
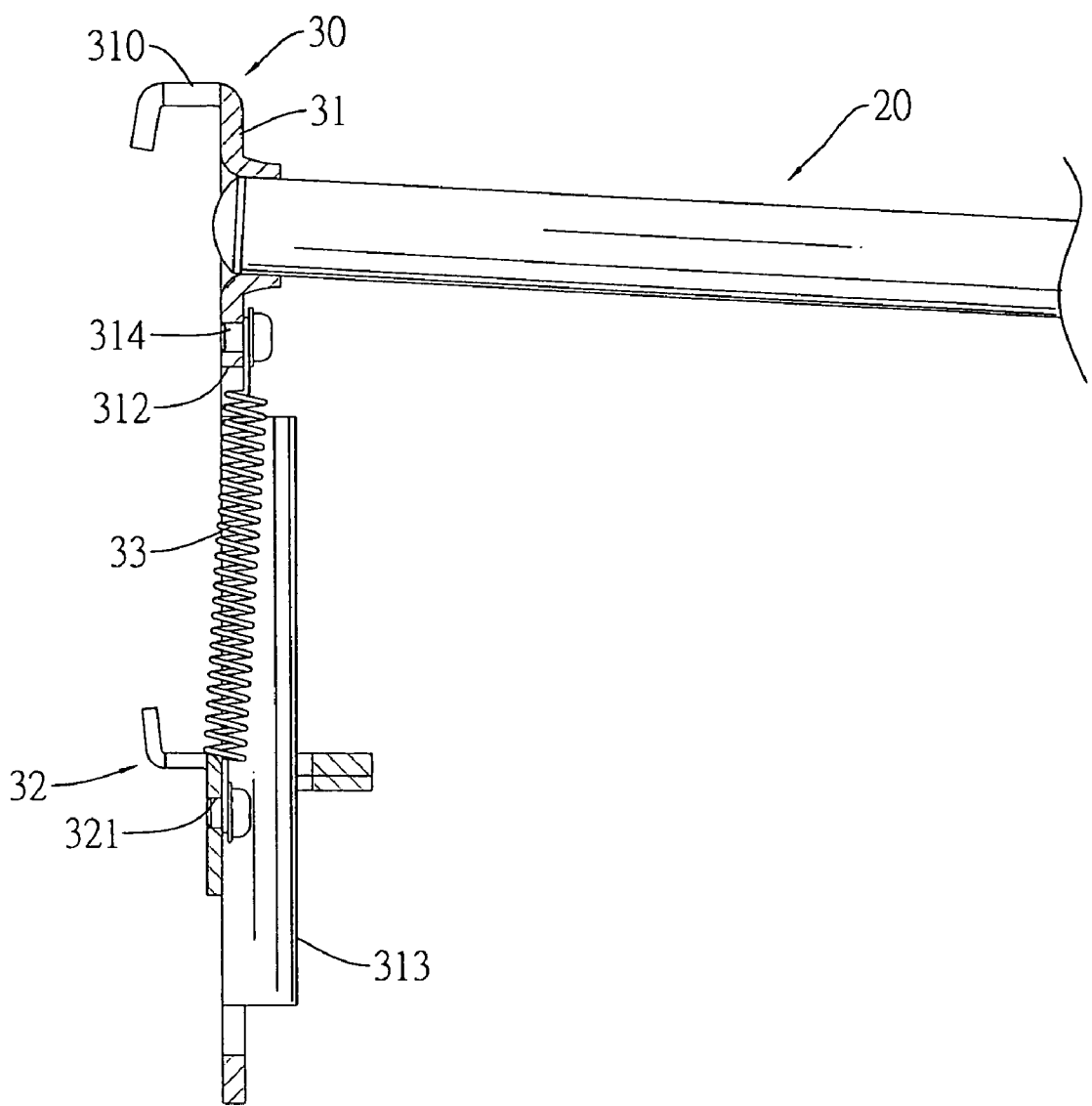
FIG. 3 is a side view in partial section of the suspension device in FIG. 1.

With reference to FIGS. 1, 2 and 3, the suspension device in accordance with the present invention comprises a mounting portion (30), an optional rod (20) and a holder (10).

The mounting portion (30) of the suspension device comprises a body (31), a movable hook assembly (32), two fasteners (314) (321) and a spring element (33).

The body (31) may be a rectangular plate and has an upper end, a lower end, a front surface, a stationary hook (310), a slot (312) and an optional cover (313).

The stationary hook (310) is formed on and protrudes downward from the upper end of the body (31) and has a free end (311). The slot (312) is defined longitudinally through the body (31) and has a front side and a top end. The cover (313) has a semicircular cross section, is formed on the front surface of the body (31) along the slot (312) and covers the front side of the slot (312).

The movable hook assembly (32) is mounted movably on the body (31), has a mounting hole (320) and a movable hook (322). The mounting hole (320) corresponds to and is slightly larger than the cross section of the body (31) to hold the body (31) and has a side surface (323) abutting the front surface of the body (31) to ensure the movable hook assembly (32) to move straightly along the body (31). The movable hook (322) is formed on and protrudes from the movable book assembly (32) and has a free end (324) bending upward and opposite to the free end (311) of the stationary hook (310).

The spring element (33) is mounted in the slot (312) of the body (31), is covered by the cover (313) and has a first end and a second end.

The fasteners (314) (321) may be screws. One of the fasteners (314) fixes the first end of the spring element (33) onto the body (31) near the top end of the slot (312). The other fastener (321) fixes the second end of the spring element (33) onto the movable hook assembly (32). By such an arrangement, the spring element (33) provides a force to pull the movable hook assembly (32) to move toward the stationary hook (310).

The rod (20) attaches securely on the front surface of the body (31) and has an end.

The holder (10) may be a clamp, is attached securely to the end of the rod (20), is connected to the mounting portion (30) with the rod (20) and holds a musical instrument (42) such as a guitar in position.

Figure 4:
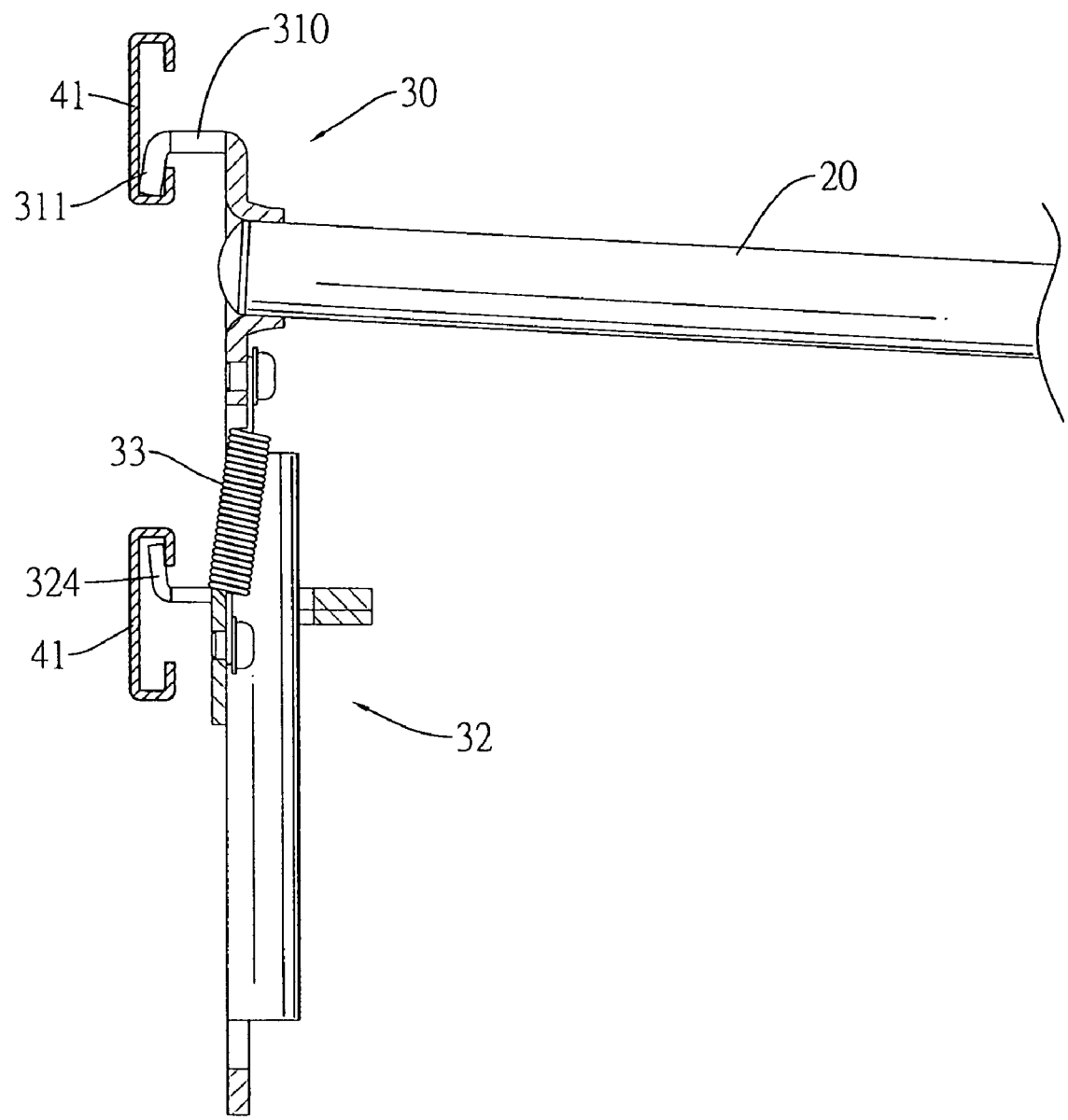
FIG. 4 is a side view in partial section of the suspension device in FIG. 1 showing the suspension device engaging two support members.

With reference to FIG. 4, two support members (41) are mounted parallelly on a wall at an interval. Each support member (41) is elongated and has a channel formed longitudinally therein.

The movable hook assembly (32) is able to be moved away from the stationary hook (310) until the stationary and movable hooks (310)(322) both correspond to the support members (41) and engage with the channels respectively. When the stationary and movable hooks (310)(322) engaging with the channels of the support members (41), the spring element (33) is draw back and provides a force to make the movable hook (322) engage with the corresponding channel tightly.

Figure 5:
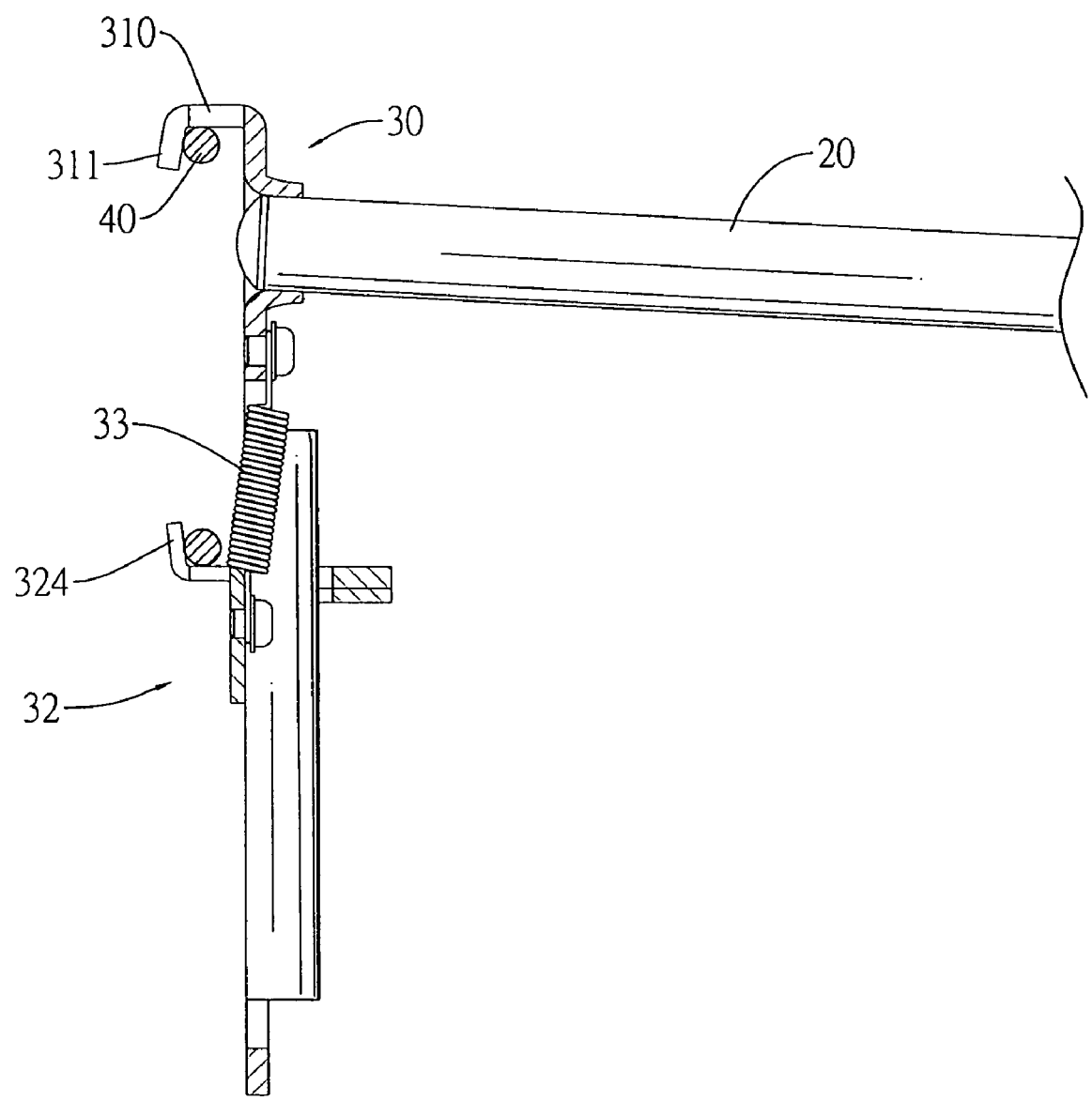
FIG. 5 is a side view in partial section of the suspension device in FIG. 1 showing the suspension device engaging two support bars.
Figure 6:
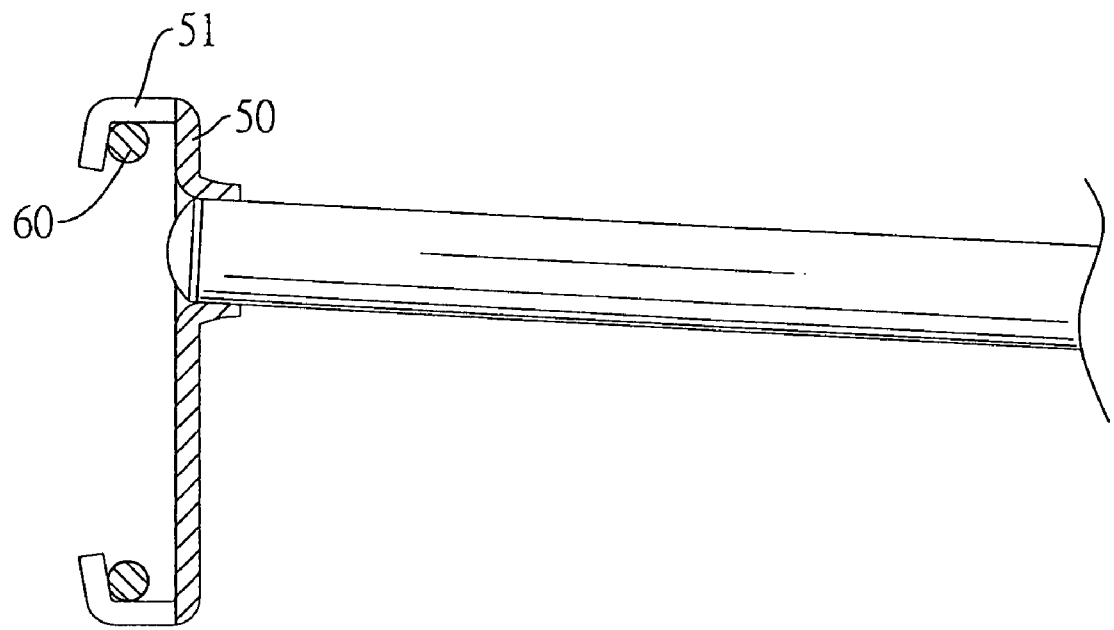
FIG. 6 is a side view in partial section of a conventional suspension device with a pair of hooks showing the suspension device engaging two support bars.
Figure 7:
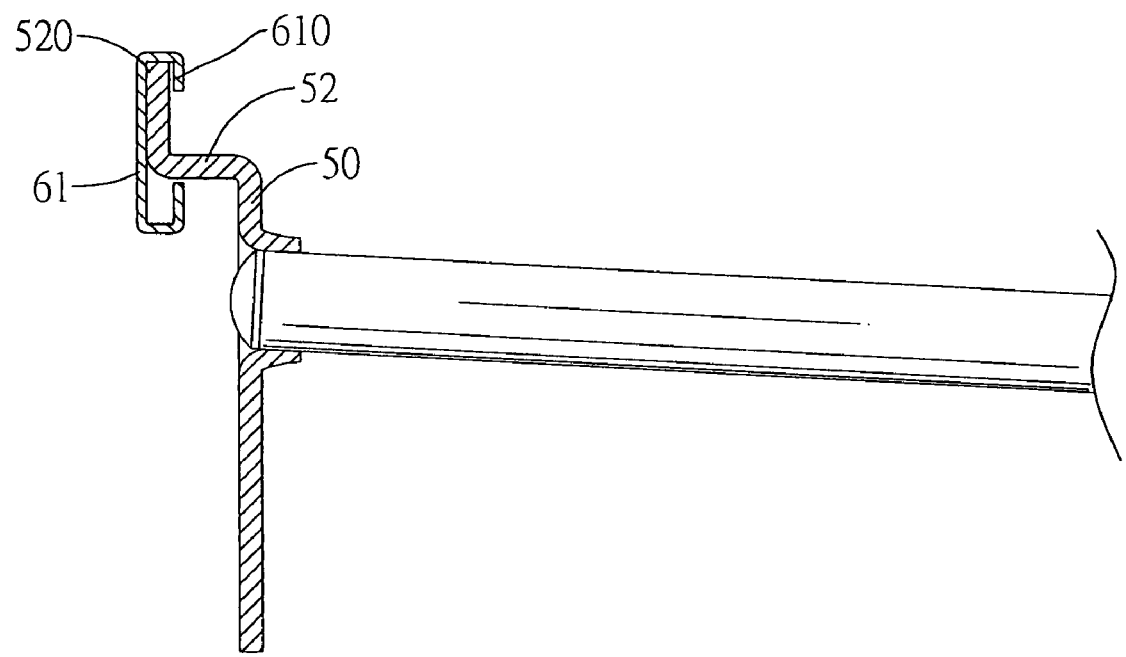
FIG. 7 is a side view in partial section of a conventional suspension device with a mounting portion showing the suspension device engaging one support member.
Figure 8:
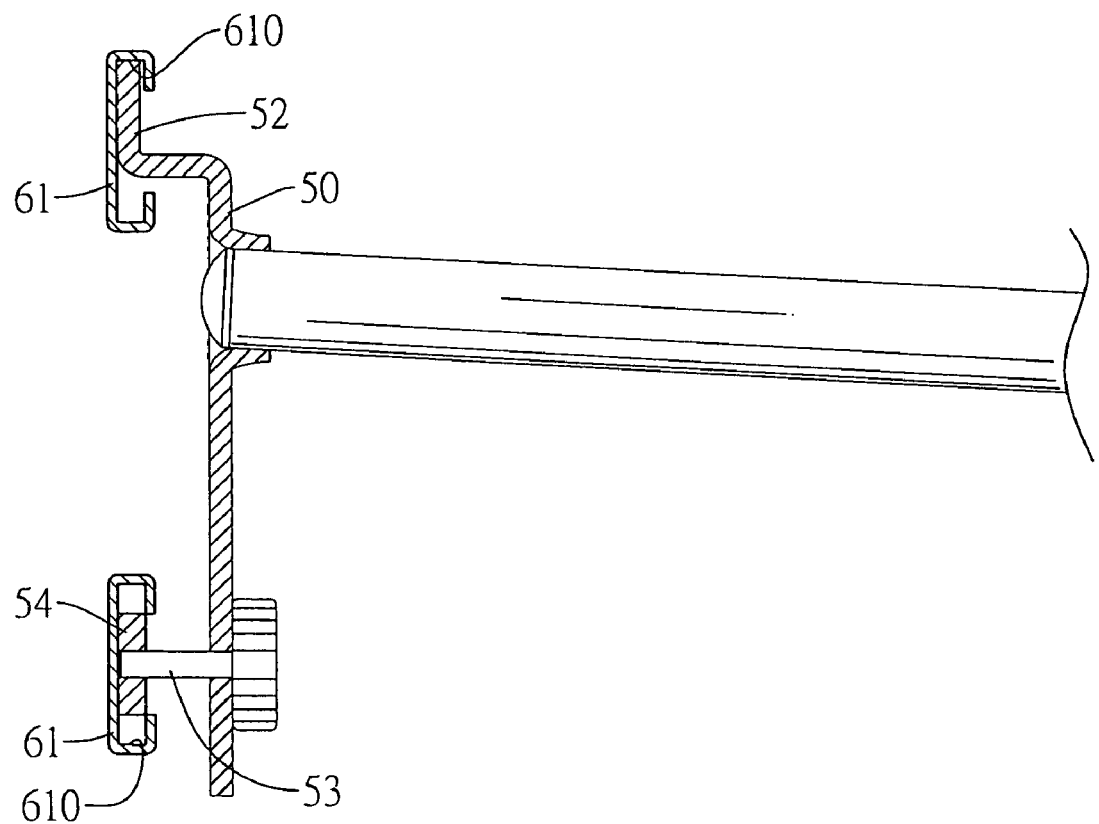
FIG. 8 is a side view in partial section of a conventional suspension device with a mounting portion and a fastener showing the suspension device engaging two support members.

With reference to FIG. 5, two support bars (40) are mounted parallelly on a net support at an interval.

The movable hook assembly (32) is able to be moved away from the stationary hook (310) until the stationary and movable hooks (310)(322) respectively correspond to and engage with the support bars (40). When the stationary and movable hooks (310)(322) engage with the support bars (40) of the net support, the spring element (33) is draw back and provides a force to make the movable hook (322) engage the support strips (40) tightly.

In such an arrangement, the suspension device in accordance with the present invention is capable of hanging a musical instrument stably for display. Furthermore, the suspension device in accordance with the present invention is convenient to use and is adjustable for fitting with two support bars or two support members at any intervals.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A suspension device comprising
a mounting portion comprising
a body having
an upper end;
a lower end;
a front surface; a rear surface;
a cross section;
a stationary hook being formed on and protruding from the upper end of the body and having a free end extending downward toward and parallel to the rear surface;
a slot being defined longitudinally through the body and having
a front side; and
a top end; and
a cover being semicircular in cross section and being formed on the front surface of the body along the slot and covering the front side of the slot;
a movable hook assembly being movably mounted on the body, having
a movable hook being formed on and protruding from the movable hook assembly and having a free end extending upward and facing to the free end of the stationary hook;
a mounting hole corresponding to and being slightly larger than the cross section of the body for holding the body inside and having a side surface being defined in the mounting hole and abutting the front surface of the body to ensure the movable hook assembly to move straightly along the body, wherein the cover is slidably received in the mounting hole; and
a spring element being mounted in the slot of the body and having a first end and a second end; and
two fasteners, one of the fasteners connected to and fixing the first end of the spring element onto the body near the top end of the slot, the other one of the fasteners connected to and fixing the second end of the spring element onto the movable hook assembly, wherein the spring element allows the movable hook assembly to adjust along the body while maintaining connected to the mounting portion; and
a holder connected to the front surface of mounting portion to hold a musical instrument in position.

2. The suspension device as claimed in claim 1 further comprising a rod attached securely on the front surface of the body and having an end.

3. The suspension device as claimed in claim 2, wherein the holder is a clamp and is attached securely to the end of the rod to connect to the mounting portion with the rod.

4. The suspension device as claimed in claim 3, wherein the body is a rectangular plate.

5. The suspension device as claimed in claim 4, wherein the fasteners are screws.

* * * * *